(12) United States Patent
King

(10) Patent No.: US 7,898,716 B2
(45) Date of Patent: Mar. 1, 2011

(54) SYSTEM AND METHOD FOR CONTROLLING A DIGITAL MICROMIRROR DEVICE (DMD) SYSTEM TO GENERATE AN IMAGE

(75) Inventor: Philip Scott King, Plano, TX (US)

(73) Assignee: Texas Instuments Incorporated, Dallas, TX (US)

( * ) Notice: Subject to any disclaimer, the term of this patent is extended or adjusted under 35 U.S.C. 154(b) by 226 days.

(21) Appl. No.: 12/176,701

(22) Filed: Jul. 21, 2008

(65) Prior Publication Data
US 2009/0034053 A1 Feb. 5, 2009

Related U.S. Application Data

(60) Provisional application No. 60/953,409, filed on Aug. 1, 2007.

(51) Int. Cl.
*G02B 26/00* (2006.01)
*G02F 1/01* (2006.01)
(52) U.S. Cl. ......... 359/238; 359/290; 359/291; 359/276; 345/690

(58) Field of Classification Search .......... 359/290–295, 359/298, 224, 225; 345/85, 204, 208, 690; 348/164, 198, 203, E5.133
See application file for complete search history.

(56) References Cited

U.S. PATENT DOCUMENTS

| 2,314,960 | A | * | 3/1943 | Willard | 348/198 |
| 5,457,493 | A | | 10/1995 | Leddy et al. | |
| 5,517,347 | A | | 5/1996 | Sampsell | |

* cited by examiner

*Primary Examiner* — Loha Ben
(74) *Attorney, Agent, or Firm* — Charles A. Brill; Wade James Brady III; Frederick J. Telecky, Jr.

(57) ABSTRACT

According to particular embodiments, a system comprises one or mores light sources, a Digital Micromirror Device (DMD) system, and a controller. A light source is configured to generate light, and the DMD system comprises DMD regions configured to modulate the light. The controller is configured to repeat the following for a number of iterations: instruct each light source to scroll the light across the DMD system at a current amplitude level; instruct one or more DMD regions to operate as one or more active regions that modulate a first portion of the light to generate an image; and instruct the remaining DMD regions to operate as an amplitude modulation region that receives a second portion of the light, the second portion of the light transitioning from a previous amplitude level to the current amplitude level.

21 Claims, 3 Drawing Sheets

SYSTEM AND METHOD FOR CONTROLLING A DIGITAL MICROMIRROR DEVICE (DMD) SYSTEM TO GENERATE AN IMAGE

RELATED APPLICATION

This application claims benefit under 35 U.S.C. §119(e) of U.S. Provisional Application Ser. No. 60/953,409, entitled "Techniques and Implementations for Laser Based Display Imaging Systems," filed Aug. 1, 2007, by Philip S. King et al.

TECHNICAL FIELD

This invention relates generally to the field of image display systems and more specifically to a system and method for controlling a Digital Micromirror Device (DMD) system to generate an image.

BACKGROUND

Spatial light modulators may be used in image display systems. In some applications, spatial light modulators may generate an image by controlling individual elements to manipulate light in order to form an image. One example of a spatial light modulator is a Digital Micromirror Device (DMD) made by TEXAS INSTRUMENTS INCORPORATED. A DMD chip typically includes an array of micromirrors that move to manipulate light.

SUMMARY OF THE DISCLOSURE

In accordance with the present invention, disadvantages and problems associated with previous techniques for generating images may be reduced or eliminated.

According to particular embodiments, a system comprises one or more light sources, a Digital Micromirror Device (DMD) system, and a controller. A light source is configured to generate light, and the DMD system comprises DMD regions configured to modulate the light. The controller is configured to repeat the following for a number of iterations: instruct each light source to scroll the light across the DMD system at a current amplitude level; instruct one or more DMD regions to operate as one or more active regions that modulate a first portion of the light to generate an image; and instruct the remaining DMD regions to operate as an amplitude modulation region that receives a second portion of the light, the second portion of the light transitioning from a previous amplitude level to the current amplitude level.

Certain embodiments of the invention may provide one or more technical advantages. A technical advantage of one embodiment may be that an amplitude modulation region receives light transitioning from one amplitude level to another amplitude level. The transitioning light may yield undesirable artifacts, so the amplitude modulation region may direct this light away from light used to generate an image. The amplitude modulation region may eliminate the need for an overscan region, a region outside of the active area of a DMD. This may increase the efficiency of image generation. Another technical advantage of one embodiment may be that the size and shape of the amplitude modulation region may be configurable by software.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
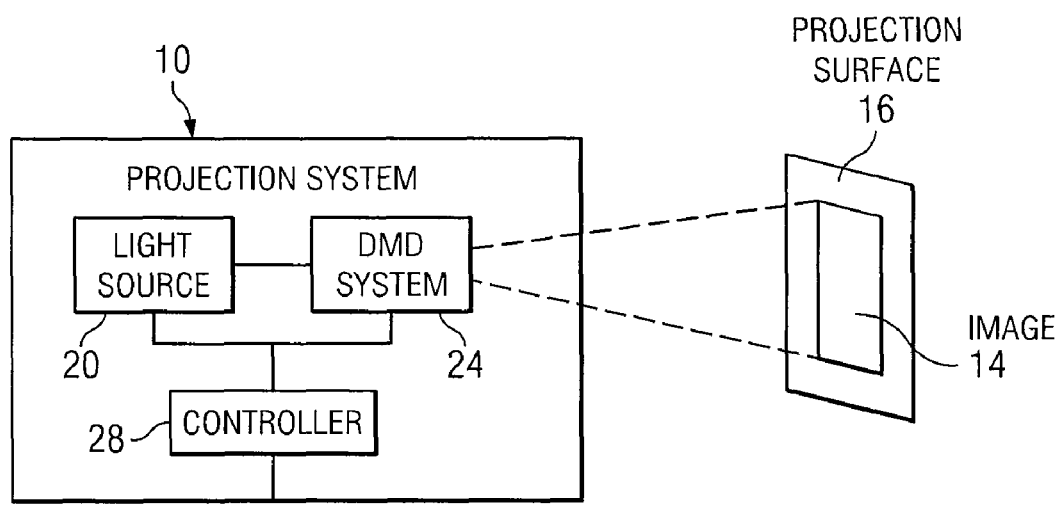
FIG. 1 illustrates an example of one embodiment of a projection system that may be used to project an image onto a projection surface.

FIG. 1 illustrates an example of one embodiment of a projection system 10 that may be used to project an image 14 onto a projection surface 16. In the illustrated example, system 10 includes one or more light sources 20, a Digital Micromirror Device (DMD) system 24, and a controller 28 coupled as shown. In an example of operation, a light source 20 generates light, which is modulated by DMD system 24 to yield image 14. Controller 28 controls the operation of light source 20 and DMD system 24 by instructing (or "directing") light source 20 and DMD system 24.

In particular embodiments, controller instructs DMD system 24 to have an active region and an amplitude modulation region. The active region may modulate light to generate image 14. The amplitude modulation region may receive light transitioning from a first amplitude level to a second amplitude level. The amplitude modulation region may direct the received light away from light used to generate image 14.

In particular embodiments, light source 20 generates a thin, rectangular, scrolling strip of light. In particular embodiments, light source 20 comprises a laser. Light source 20 may generate light of any suitable color, such as red, green, cyan, and/or blue. In particular embodiments, light source 20 may comprise red, green, and/or blue light sources that generate beams of wavelengths 640 nanometers (nm), 532 nm, and/or 450 nm, respectively.

In particular embodiments, image 14 is formed by frames. Frames may be generated any suitable number of times per second, such as less than 50, 50 to 60, 60 to 70, or more than 70 times per second. In particular embodiments, a light source 20 may scroll light across DMD system 24 multiple times per frame of image 14. Light may be scrolled any suitable number of times per frame, such as less than 50, 50 to 60, 60 to 70, or over 70 times.

A light source 20 may emit light of any suitable intensity, depending on, for example, the desired brightness and efficiencies of system 10. In particular embodiments, the intensity may be changed by electronically or mechanically modulating the amplitude level. For example, a light source may be electronically amplitude modulated by modifying the driving current or voltage of the light source. As another example, a light source may be mechanically amplitude modulated by adjusting an aperture of the light source.

The intensity may be changed according to weights given with respect to a reference amplitude. A reference amplitude may be any amplitude between no generated light and the maximum intensity that the light source can generate. Accordingly, weights may be greater than, equal to, or less than one. For example, weights may be less than 0.5, 0.5 to 1.0, 1.0 to 1.5, or greater than 1.5. In particular embodiments, the intensity may be changed many times using a sequence of weights. The sequence of weights may be decreasing or increasing, and may change by a factor of n or 1/n. For example, a sequence may be 1.0, 0.5, 0.25, and 0.125. In particular embodiments, an amplitude modulated bit may be created from a combination of two or more different scrolls.

In particular embodiments, a laser may emit light that yields a band (that is, a long, thin rectangle) of light across DMD system 24. The longer sides of the band may define a "band direction." Subsequent bands may be formed in a "scrolling direction," which may (or may not) be substantially perpendicular to the band direction.

In an example, if DMD system 24 is substantially rectangular, a laser may form a light band across DMD system 24 that runs from a first edge (for example, a first side edge) of DMD system 24 to a second edge for example, a second side edge) opposite to the first edge. The band direction may be substantially parallel to third and forth edges (for example, top and bottom edges) that are adjacent to the first and second edges. In the example, a laser may form a band near the top edge and form subsequent bands in a scrolling direction towards the bottom edge. A current band may be adjacent to where a previous band was located, but closer to the bottom edge than the previous band.

In particular embodiments, if lasers of light source 20 each emit different colors of light, each laser may scroll light onto different areas of DMD system 24, such that the bands do not overlap. In certain examples, there may be a dark band between the color bands.

In particular embodiments, DMD system 24 (or "DMD apparatus") may comprise an array of hundreds of thousands of DMD structures that include mirrors. The array may have any suitable size, for example, 320×240, 640×480, 720×480, 1280×720, 1920×1080 pixels. The mirrors reflect light to modulate the light to generate image 14. The mirrors may be reset to move the mirrors to change the modulation, and may be reset when the mirrors are not illuminated.

In particular embodiments, the DMD structures may be grouped in reset groups (or "blocks"), in which mirrors of a reset group are reset substantially simultaneously. A reset group may have any suitable size, for example, for a 640×480 array, the reset group may be 32 pixels. In particular embodiments, a reset group may be a band, where the longer sides of the band define a reset direction. Light band may be directed towards DMD system 24 such that a light band substantially illuminates a reset group. That is, the band direction may be substantially parallel to the reset direction, and the scrolling direction may be substantially perpendicular to the reset direction.

In particular embodiments, one or more adjacent reset groups may be organized into DMD regions. That is, a DMD region may include n reset groups, where n is a whole number. In particular embodiments, one or more DMD regions may be illuminated by light of a particular intensity. An example of DMD system 24 is described in more detail with reference to FIG. 3.

In particular embodiments, controller 28 (or "control system") may instruct (or "direct") each laser of light source 20 to scroll light across DMD system 24. Controller 28 may instruct one or more DMD regions to operate as one or more active regions and the remaining one or more DMD regions to operate as an amplitude modulation region. The border of the amplitude modulation region may be substantially parallel to the reset direction. An active region may modulate light to generate image 14. An amplitude modulation region may receive light transitioning from a first amplitude level to a second amplitude level, which is not used to generate image 14. The amplitude modulation region may have DMD structures that direct the light to mitigate artifacts that may be caused by amplitude modulation of the light sources. For example, the DMD structures may be in an off state. An example of controller 28 is described in more detail with reference to FIG. 3.

Modifications, additions, or omissions may be made to system 10 without departing from the scope of the invention. The components of system 10 may be integrated or separated. Moreover, the operations of system 10 may be performed by more, fewer, or other components. Additionally, operations of system 10 may be performed using any suitable logic comprising software, hardware, and/or other logic. As used in this document, "each" refers to each member of a set or each member of a subset of a set.

Figure 2:
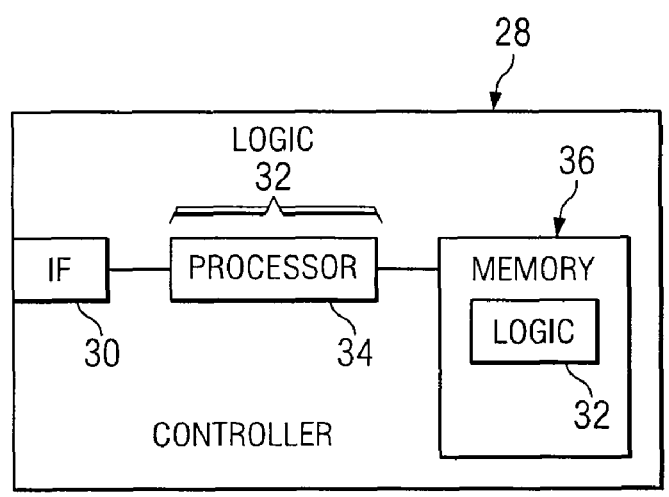
FIG. 2 illustrates an example of one embodiment of a controller that may be used with the system of FIG. 1.

FIG. 2 illustrates an example of one embodiment of controller 28 that may be used with system 10 of FIG. 1. In certain examples, controller 28 includes an interface 30, logic 32 (such as a processor 34), and a memory 36. Interface 30 receives input, sends output, processes the input and/or output, and/or performs other suitable operation. Interface 30 may comprise hardware and/or software.

Logic 32 performs the operations of the component, for example, executes instructions to generate output from input. Logic 32 may include hardware, software, and/or other logic. Logic 32 may be encoded in one or more tangible media and may perform operations when executed by a computer. Certain logic 32, such as processor 34, may manage the operation of a component. Examples of processor 34 include one or more computers, one or more microprocessors, one or more applications, and/or other logic.

Memory 36 stores information, such as logic 32. Memory 36 may comprise one or more tangible, computer-readable, and/or computer-executable storage media. Examples of memory 36 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In certain examples, logic 32 may control the operations of controller 28. An example of the operations performed by controller 28 is described in more detail with reference to FIG. 4.

Figure 3:
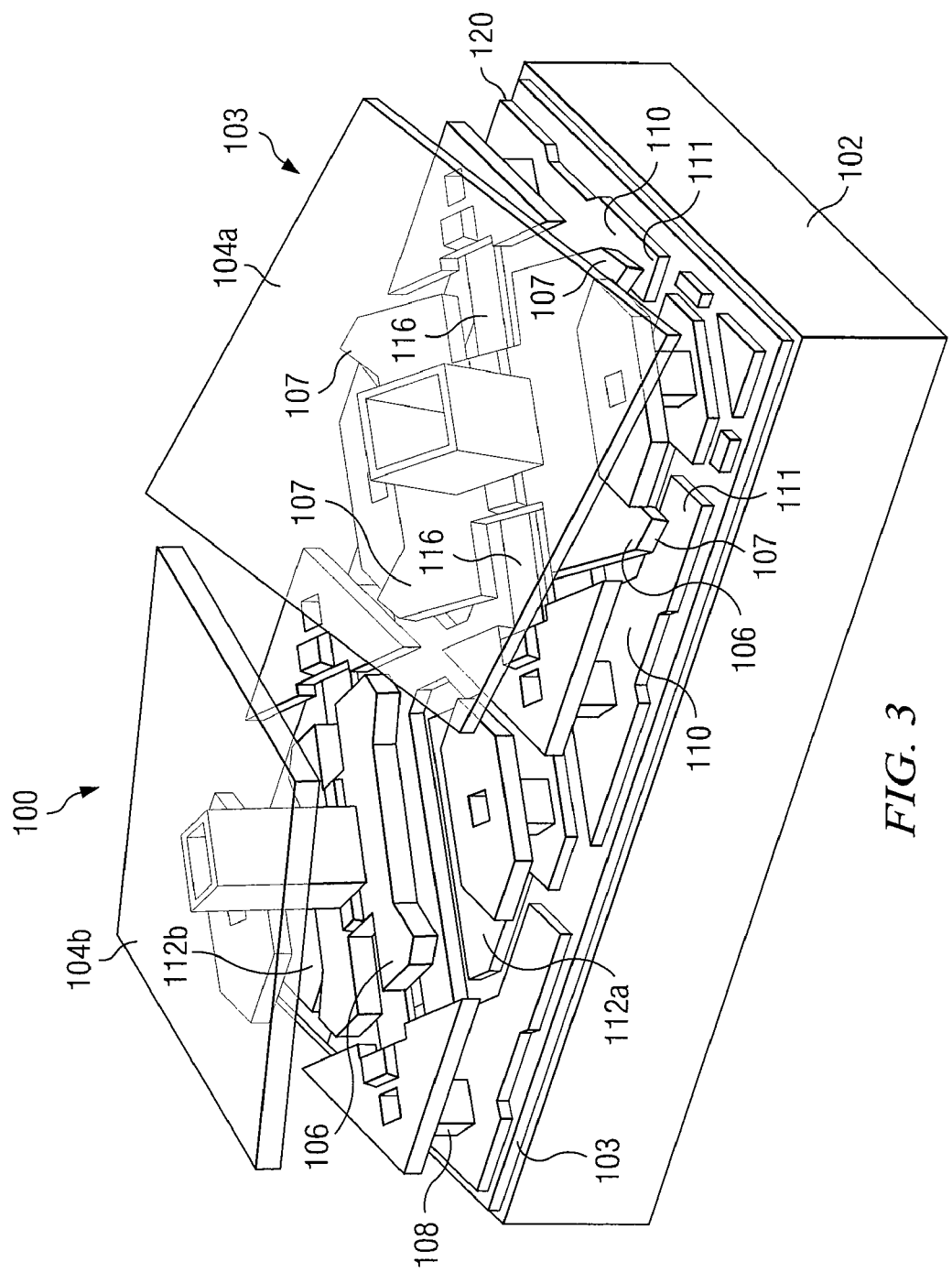
FIG. 3 illustrates a perspective view of a portion of an example of a DMD system that may be used with the system of FIG. 1.

FIG. 3 illustrates a perspective view of a portion 100 of an example of a DMD system 24 that may be used with system 10 of FIG. 1. DMD system 24 may have an array of hundreds of thousands of DMD structures 103 that include mirrors that move to reflect light.

In the illustrated example, portion 100 includes a substrate 102 with an insulating layer 103 disposed outwardly from substrate 102. A conductive layer 120 is disposed outwardly from insulating layer 103. Conductive layer 120 includes conductive conduits 110 (with landing pads 111) and electrodes 112 coupled as shown. A DMD structure 103 is disposed outwardly from substrate 102. DMD structure 103 includes posts 108, yoke 106 (with yoke tips 107), a hinge 116, and a micromirror 104 coupled as shown.

In particular embodiments, substrate 102 may comprise a semiconductor substrate such as a complementary metal-oxide semiconductor (CMOS) substrate. Insulating layer 103 operates to insulate substrate 102 from electrodes 112 and conductive conduits 110, and may comprise an oxide. Conductive layer 120 operates as a conductor, and may comprise an aluminum alloy or other suitable conductive material. Electrodes 112 and conductive conduits 110 are formed within conductive layer 120.

DMD structure 103 moves to selectively reflect light. A micromirror 104 comprises a reflective surface of any suitable size and shape. In particular embodiments, micromirror 104 has a square shape with a length of less than 20, 17, 13, or 10 microns. Posts 108 support hinge 116, which moves to tilt micromirror 104 to an "on" or "off" state to selectively reflect light. Micromirror 104 may tilt up to plus or minus less than 8, 10, or more than 12 degrees.

In operation, conductive layer 120 receives a bias voltage that at least partially contributes to creation of electrostatic forces between electrodes 112, micromirrors 104, and/or yoke 106. The electrostatic forces cause DMD structure 103 to rotate on the axis defined by hinge 116. The movement stops when a part of DMD structure 103 touches an obstruction, such as when yoke tips 107 touch landing pad 111.

Modifications, additions, or omissions may be made to portion 100 without departing from the scope of the invention. The components of portion 100 may be integrated or separated. Moreover, the operations of portion 100 may be performed by more, fewer, or other components. Additionally, operations of portion 100 may be performed using any suitable logic comprising software, hardware, and/or other logic.

Figure 4:
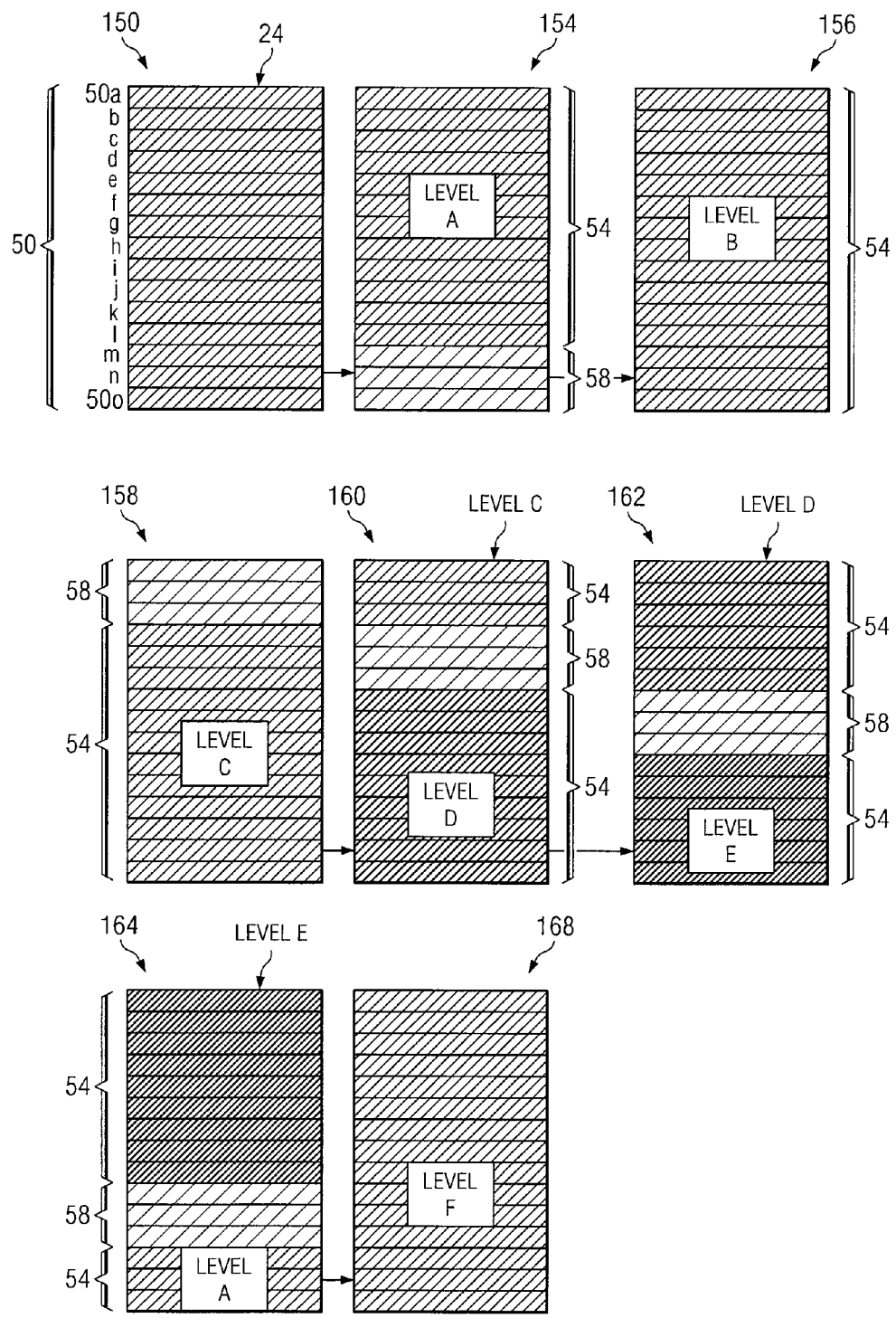
FIG. 4 illustrates an example of a method that may be performed by the controller of FIG. 2.

FIG. 4 illustrates an example of a method that may be performed by controller 28 of FIG. 2. The method is performed with DMD system 24. DMD system 24 comprises DMD regions 50 (50a, 50b, . . . , and/or 50o) of DMD structures.

The illustrated method describes illumination by one laser. The method may be extended to illumination by more than one laser by performing the steps for additional lasers. Different bands produced by different lasers may be substantially non-overlapping and may have dark bands separating the bands.

In certain examples, controller 28 instructs a laser to scroll light across DMD system 24 for one or more iterations. In the examples, scrolling that substantially covers DMD system 24 may be regarded as an iteration. Controller 28 may instruct the laser to scroll light at a particular amplitude level at each iteration. In the illustrated example, levels A through F may be weighted with any suitable values, for example, A=1.0, B=0.5, C=0.25, D=0.125, E=0.0625, and F=1.0. In the example, there is no modulation region between levels A and F, so these levels are the same. In certain examples, modulation from one amplitude level to another amplitude level may occur when the light is incident within an amplitude modulation (AM) region 58. In certain examples, modulation from one amplitude level to another amplitude level may occur within the time it takes for a scroll to cover one or more DMD regions.

In certain examples, controller 28 directs one or more DMD regions 50 to operate as an active region 54 and the remaining one or more DMD regions 50 to operate as an amplitude modulation (AM) region 58 at each iteration. Active region 54 modulates light to generate image 14. AM region 58 receives light transitioning from a first amplitude level to a second amplitude level, which is not used to generate image 14. Controller 28 may direct AM region 58 to direct the light to mitigate artifacts that may be caused by amplitude modulation of the light sources. For example, controller 28 may direct AM region 58 to assume an off state.

In certain examples, controller 28 may select DMD regions 50 of a current iteration that are substantially adjacent to the DMD regions 50 operating as AM region 58 of a previous iteration.

The method starts at step 150 with DMD system 24. At step 154, controller 28 instructs the laser to scroll across DMD system 24 with light of amplitude level A. Controller 28 also directs DMD regions 50a-l to operate as active region 54 and DMD regions 50m-o to operate as AM region 58. At step 156, controller 28 instructs the laser to scroll across DMD system 24 with light of amplitude level B. Controller 28 also directs DMD regions 50a-0 to operate as active region 54.

At step 158, controller 28 instructs the laser to scroll across DMD system 24 with light of amplitude level C. Controller 28 also directs DMD regions 50d-o to operate as active region 54 and DMD regions 50a-c to operate as AM region 58. At step 160, controller 28 instructs the laser to scroll across DMD system 24 with light of amplitude level D. Controller 28 also directs DMD regions 50a-c, g-o to operate as active region 54 and DMD regions 50d-f to operate as AM region 58.

At step 162, controller 28 instructs the laser to scroll across DMD system 24 with light of amplitude level E. Controller 28 also directs DMD regions 50a-f, j-o to operate as active region 54 and DMD regions 50g-i to operate as AM region 58. At step 164, controller 28 instructs the laser to scroll across DMD system 24 with light of amplitude level A. Controller 28 also directs DMD regions 50a-i, m-o to operate as active region 54 and DMD regions 50j-l to operate as AM region 58.

At step 168, controller 28 instructs the laser to scroll across DMD system 24 with light of amplitude level F. There is no modulation region between levels A and F, these levels are the same. Controller 28 also directs DMD regions 50a-o to operate as active region 54. Controller 28 may perform the method for a number of iterations until, for example, a signal to stop is received.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that an amplitude modulation region receives light transitioning from one amplitude level to another amplitude level. The transitioning light may yield undesirable artifacts, so the amplitude modulation region may direct this light away from light used to generate an image. The amplitude modulation region may eliminate the need for an overscan region, which may increase the efficiency of image generation. Another technical advantage of one embodiment may be that the size and shape of the amplitude modulation region may be configurable by software.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
  one or more light sources, each light source configured to generate light;
  a Digital Micromirror Device (DMD) system comprising a plurality of DMD regions, each DMD region configured to modulate the light; and a controller coupled to the one or more light sources and the DMD system, the controller configured to repeat the following for a plurality of iterations:

instruct each light source to scroll the light across the DMD system at a current amplitude level;

instruct one or more DMD regions to operate as one or more active regions that modulate a first portion of the light to generate an image; and instruct a remaining one or more DMD regions to operate as an amplitude modulation region that receives a second portion of the light, the second portion of the light transitioning from a previous amplitude level to the current amplitude level.

2. The system of claim 1, the controller configured to instruct the remaining one or more DMD regions to operate as the amplitude modulation region by:

selecting one or more DMD regions of a current iteration that are substantially adjacent to the DMD regions that operated as the amplitude modulation region of a previous iteration; and instructing the selected one or more DMD regions to operate as the amplitude modulation region.

3. The system of claim 1, the controller configured to instruct the remaining one or more DMD regions to operate as the amplitude modulation region by:

instructing the remaining one or more DMD regions to assume an off state.

4. The system of claim 1, the controller configured to instruct the remaining one or more DMD regions to operate as the amplitude modulation region by:

instructing the remaining one or more DMD regions to direct the second portion of the light to mitigate amplitude modulation artifacts.

5. The system of claim 1, each DMD region comprising one or more reset groups of the DMD system.

6. The system of claim 1, the current amplitude level resulting from a weight given with respect to a reference amplitude.

7. The system of claim 1, the controller configured to instruct each light source to scroll the light across the DMD system at a different amplitude level at each iteration, the different amplitude levels resulting from a sequence of different weights given with respect to a reference amplitude.

8. The system of claim 1, the one or more light sources comprising a red light source, a green light source, and a blue light source.

9. The system of claim 1, the DMD system configured to combine the light modulated during two or more iterations to generate a bit of the image.

10. The system of claim 1, a scrolling direction of the light substantially perpendicular to a reset direction of a plurality of reset groups of the DMD system.

11. A method comprising:

performing, by a control system, the following for a plurality of iterations:

directing each light source of one or more light sources to scroll the light across a Digital Micromirror Device (DMD) apparatus at a current amplitude level, each light source configured to generate light, the DMD apparatus comprising a plurality of DMD regions, each DMD region configured to modulate the light, the control system coupled to the one or more light sources and the DMD apparatus;

directing one or more DMD regions to operate as one or more active regions that modulate a first portion of the light to generate an image; and directing a remaining one or more DMD regions to operate as an amplitude modulation region that receives a second portion of the light, the second portion of the light transitioning from a previous amplitude level to the current amplitude level.

12. The method of claim 11, the directing the remaining one or more DMD regions to operate as the amplitude modulation region further comprising:

selecting one or more DMD regions of a current iteration that are substantially adjacent to the DMD regions that operated as the amplitude modulation region of a previous iteration; and directing the selected one or more DMD regions to operate as the amplitude modulation region.

13. The method of claim 11, the directing the remaining one or more DMD regions to operate as the amplitude modulation region further comprising:

directing the remaining one or more DMD regions to assume an off state.

14. The method of claim 11, the directing the remaining one or more DMD regions to operate as the amplitude modulation region further comprising:

directing the remaining one or more DMD regions to direct the second portion of the light to mitigate amplitude modulation artifacts.

15. The method of claim 11, each DMD region comprising one or more reset blocks of the DMD apparatus.

16. The method of claim 11, the current amplitude level resulting from a weight given with respect to a reference amplitude.

17. The method of claim 11, further comprising:

directing each light source to scroll the light across the DMD apparatus at a different amplitude level at each iteration, the different amplitude levels resulting from a sequence of different weights given with respect to a reference amplitude.

18. The method of claim 11, the one or more light sources comprising a red light source, a green light source, and a blue light source.

19. The method of claim 11, further comprising:

combining the light modulated during two or more iterations to generate a bit of the image.

20. The method of claim 11, a scrolling direction of the light substantially perpendicular to a reset direction of a plurality of reset blocks of the DMD apparatus.

21. A system comprising:

one or more light sources, each light source configured to generate light, the one or more light sources comprising a red light source, a green light source, and a blue light source;

a Digital Micromirror Device (DMD) system comprising a plurality of DMD regions, each DMD region configured to modulate the light, each DMD region comprising one or more reset groups of the DMD system; and a controller coupled to the one or more light sources and the DMD system, the controller configured to repeat the following for a plurality of iterations:

instruct each light source to scroll the light across the DMD system at a current amplitude level, a scrolling direction of the light substantially perpendicular to a reset direction of a plurality of reset groups of the DMD system;

instruct one or more DMD regions to operate as one or more active regions that modulate a first portion of the light to generate an image;

instruct a remaining one or more DMD regions to operate as an amplitude modulation region that receives a second portion of the light, the second portion of the light transitioning from a previous amplitude level to the current amplitude level, the current amplitude level resulting from a weight given with respect to a reference amplitude, the controller configured to instruct the remaining one or more DMD regions to operate as the amplitude modulation region by:

selecting one or more DMD regions of a current iteration that are substantially adjacent to the DMD regions that operated as the amplitude modulation region of a previous iteration;

instructing the selected one or more DMD regions to operate as the amplitude modulation region;

instructing the remaining one or more DMD regions to assume an off state;

instructing the remaining one or more DMD regions to direct the second portion of the light to mitigate amplitude modulation artifacts; and instruct each light source to scroll the light across the DMD system at a different amplitude level at each iteration, the different amplitude levels resulting from a sequence of different weights given with respect to a reference amplitude; and the DMD system configured to combine the light modulated during two or more iterations to generate a bit of the image.

* * * * *